United States Patent
Hsieh et al.

(10) Patent No.: US 8,756,447 B2
(45) Date of Patent: Jun. 17, 2014

(54) APPARATUS AND METHOD FOR TRANSMITTING A PAUSE FRAME TO A LINK PARTNER TO ESTABLISH A TRANSMISSION PAUSE PERIOD ACCORDING TO A LOW DATA RATE BEING DETECTED

(75) Inventors: Yao-Yu Hsieh, Yangmei Township, Taoyuan County (TW); Jung-You Feng, Hsinchu (TW); Mu-Jung Hsu, Zhonghe (TW)

(73) Assignee: Realtek Semiconductor Corp., Hsinchu (TW)

( * ) Notice: Subject to any disclaimer, the term of this patent is extended or adjusted under 35 U.S.C. 154(b) by 93 days.

(21) Appl. No.: 13/073,831

(22) Filed: Mar. 28, 2011

(65) Prior Publication Data

US 2011/0239024 A1 Sep. 29, 2011

(30) Foreign Application Priority Data

Mar. 29, 2010 (TW) ................................ 99109468 A (51) Int. Cl.
*G06F 1/00* (2006.01)

(52) U.S. Cl.
USPC ........................................................ 713/323

(58) Field of Classification Search
None
See application file for complete search history.

(56) References Cited

U.S. PATENT DOCUMENTS

| | | | |
|---|---|---|---|
| 5,784,559 A | 7/1998 | Frazier et al. | |
| 6,098,100 A | 8/2000 | Wey et al. | |
| 6,339,792 B1 | 1/2002 | Allison et al. | |
| 6,591,368 B1 | 7/2003 | Ryu | |
| 6,628,613 B1 | 9/2003 | Joung et al. | |
| 6,993,667 B1 | 1/2006 | Lo | |
| 7,103,785 B2 | 9/2006 | Green et al. | |
| 8,156,359 B1 * | 4/2012 | Sedarat et al. | 713/320 |
| 8,228,796 B2 * | 7/2012 | Ahn et al. | 370/232 |
| 2010/0023658 A1 | 1/2010 | Diab et al. | |
| 2011/0110282 A1 * | 5/2011 | Wu et al. | 370/311 |

FOREIGN PATENT DOCUMENTS

TW 200947951 11/2009

\* cited by examiner

*Primary Examiner* — Thomas Lee
*Assistant Examiner* — Zhipeng Wang
(74) *Attorney, Agent, or Firm* — McClure, Qualey & Rodack, LLP (57) ABSTRACT

A low power consumption network device includes: a data rate meter for detecting a data rate of the network device; a state machine unit for determining a state of the network device according to the data rate and for generating an instruction signal; and a power control unit for controlling a power consumption state of the network device according to the instruction signal. According to the data rate, the state machine unit controls whether the network device transmits a pause frame to a link partner, so that the link partner stops transmitting data to the network device during a pause period. During the pause period, the power control unit controls the network device into a power saving mode.

20 Claims, 6 Drawing Sheets

FIG. 6

APPARATUS AND METHOD FOR TRANSMITTING A PAUSE FRAME TO A LINK PARTNER TO ESTABLISH A TRANSMISSION PAUSE PERIOD ACCORDING TO A LOW DATA RATE BEING DETECTED This application claims the benefit of Taiwan application Serial No. 99109468, filed Mar. 29, 2010, the subject matter of which is incorporated herein by reference.

BACKGROUND OF THE DISCLOSURE

1. Technical Field

The disclosure relates in general to a network device and a communication method thereof, and more particularly to a low power consumption network device and a communication method thereof.

2. Background

Ethernet network is a widely used technology in local area network (LAN) for connecting a personal computer to a local area network. A basic unit of data transmission in Ethernet network is a packet. A switch is a most widely used bridge in a local area network, and examples of other bridges include router.

The switch includes multiple ports coupled to a personal computer, a notebook computer or other bridges. After a port of the switch receives a packet, the switch selects an appropriate destination port according to the destination address of the packets and further transfers the packet to the destination port.

In a normal operating mode, each port of the switch monitors whether a packet is received and further processes the received packet, and such operations incur power consumption. However, not all the ports receive packet all the time. When packet flow is very low or even nil, it is a waste of energy if the switch is still ready for receiving packets. When packet flow is low and normal operations still need to be maintained, the network device has to maintain at power-ON state all the time. In fact, the period that the network device receives or transmits data is very short, and it is a waste of energy.

Therefore, an embodiment of the disclosure provides a low power consumption network device, which effectively saves power consumption without causing network congestion when the network device and its link partner are both in an OFF state or a power saving mode.

BRIEF SUMMARY OF THE DISCLOSURE

The disclosure is directed to a low power consumption network device and a communication method thereof. When the data flow is substantially very low, the network device informs the link partner to stop data transmission, and the network device enters a power saving mode to save power consumption.

The disclosure is directed to a low power consumption network device and a communication method thereof. When the data flow is substantially 0, the power-saving period of the network device is dynamically extended to further save power consumption.

The disclosure is directed to a low power consumption network device and a communication method thereof. When the network device is operated in the power saving mode, despite the network device needs to transmit data to the link partner, the network device does not return to the normal mode immediately but will wait for a "transmission wake-up period" before resuming the normal mode so as to assure that the power-saving period of the network device is not very short.

According to an embodiment of the disclosure, a low power consumption network device is provided. The low power consumption network device is applied in a network. The network device transmits data between a link partner through the network. The low power consumption network device includes: a data rate meter for detecting a data rate of the network device; a state machine unit coupled to the data rate meter for determining an operating mode of the network device according to the data rate and for generating an instruction signal; and a power control unit coupled to the state machine unit for controlling a power consumption state of the network device according to the instruction signal. The state machine unit determines whether the network device transmits a pause frame to the link partner according to the data rate, so that the link partner stops data transmission during a pause period and the power control unit controls the network device in a power saving mode during the pause period.

According to another embodiment of the disclosure, a network communication method applied in a network device is provided. The network device transmits data between a link partner through a network. The method includes: detecting a data rate of the network device; determining an operating mode of the network device according to the data rate, and generating an instruction signal; controlling a power consumption state of the network device according to the instruction signal; according to the data rate, determining whether the network device transmits a pause frame to the link partner so that the link partner stops data transmission during a pause period; and controlling the network device to be operated in a power saving mode during the pause period.

According to yet another embodiment of the disclosure, a network device is provided. The network device includes a data rate meter for detecting a data rate of the network device; a state machine unit coupled to the data rate meter for determining an operating mode of the network device according to the data rate and for generating an instruction signal; and a power control unit coupled to the state machine unit for controlling a power consumption state of the network device according to the instruction signal. The state machine unit determines whether the network device transmits a pause frame according to the data rate, and after the pause frame is transmitted out, the state machine unit determines that the operating mode is a power saving mode and the power control unit reduces the power consumption of the network device so that the network device is operated in the power saving mode.

It is to be understood that both the foregoing general description and the following detailed description are exemplary and explanatory only and are not restrictive of the disclosed embodiments, as claimed.

DETAILED DESCRIPTION OF EXEMPLARY EMBODIMENT OF THE PRESENT DISCLOSURE

The embodiment of the disclosure provides a power saving mechanism applicable to conventional network devices. According to the data flow (data rate) control mechanism, the network device informs its linked network device not to transmit packets within a particular period. Thus, the network device of the present disclosure can identify when its linked network device transmits packets and when its linked network device does not transmit packets. The network device enters into a power saving mode (for example, turning off the physical layer circuit (PHY)) after confirming that its linked network device will not transmit packets, and will resume a normal mode (for example, turning on the PHY to receive packets) after confirming that it may receive packets.

Figure 1:
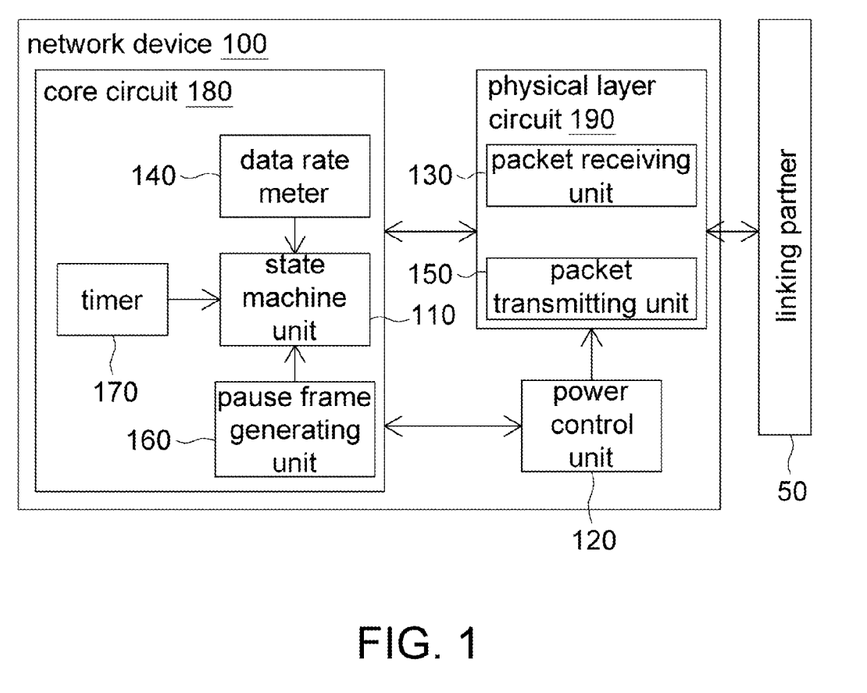
FIG. 1 shows a functional block diagram of a network device according to an embodiment of the disclosure.

Referring to FIG. 1, a functional block diagram of a network device according to an embodiment of the disclosure is shown. As indicated in FIG. 1, the network device 100 of the embodiment includes a state machine unit 110, a power control unit 120, a packet receiving unit 130, a data rate meter 140, a packet transmitting unit 150, a pause frame generating unit 160 and a timer 170. The state machine unit 110, the data rate meter 140, the pause frame generating unit 160 and the timer 170 are inside a core circuit 180. The packet receiving unit 130 and the packet transmitting unit 150 are inside a physical layer circuit 190. The network device 100 is connected to the link partner 50. The connection between the link partner 50 and the network device 100 may be wired or wireless.

The state machine unit 110 controls the operating mode (such as the power saving mode or the normal mode) of the network device 100 according to the data rate (the amount of the received packets or the amount of the transmitting packets).

After receiving an instruction signal from the state machine unit 110, the power control unit 120 will turn on/off the packet receiving unit 130 and the packet transmitting unit 150. In other words, the power control unit 120 turns on/off the physical layer circuit 190 according to the instruction signal generated by the state machine unit 110.

After receiving the packets transmitted from the link partner 50, the packet receiving unit 130 transmits the length data of the received packet to the data rate meter 140 for gathering the statistics of the data flow, and transmits the received packet to the upper layer circuit.

When the network device 100 needs to transmit packets to the link partner 50, the upper layer circuit will prepare and send the packets to the packet transmitting unit 150. After receiving the packets from the upper layer circuit, the packet transmitting unit 150 transmits the length data of the packet to the data rate meter 140 for gathering the statistics of the data flow and transmits the packet to the link partner 50.

After receiving the instruction signal generated by the state machine unit 110, the pause frame generating unit 160 produces a pause frame and a pause off frame, and further transmits to the packet transmitting unit 150, so that the two frames are transmitted to the link partner 50 from the packet transmitting unit 150.

Besides, the timer 170 activates multiple timers according to the instruction signal generated by the state machine unit 110.

The pause frame defines a pause upper limit time period that link partner 50 can not transmit packet. After the pause upper limit time period is over or after the link partner 50 receives the pause off frame from the network device 100, the link partner 50 may send packet to the network device 100. The pause off frame is used for informing the link partner 50 that the pause is over, and the link partner 50 can start to transmit packet to the network device 100.

According to an embodiment, the pause frame includes (a) a destination address field, (b) a source address field, (c) a type field, (d) a MAC control opcode field, (e) a MAC control parameter field, (f) a reserved code field and (g) an error check field.

The (a) destination address field is used for recording the destination address of the packet, and has a length of 6 bytes (byte).

The (b) source address field is used for recording the source address of the packet, and has a length of 6 bytes.

The (c) type field is used for indicating the type of the packet, and has a length of 2 bytes.

The (d) MAC control opcode field has a length of 2 bytes.

The (e) MAC control parameter field is used for defining the time period that link partner 50 can not transmit packet. This filed has a length of 2 bytes. Suppose the link partner 50 receives the pause frame, and if the link partner would like to send a packet within the pause time, the packet must be buffered in a queue of the link partner 50 and is not allowed to be transmitted to the network device 100 until the pause time is over.

The (f) reserved code field has a length of 42 bytes, which may all be 0.

The (g) error check field is used for packet error check, and has a length of 4 bytes.

The format of the pause off frame is basically identical to that of the pause frame except that the value of the MAC control parameter field is 0. That is, after the link partner 50 receives the pause off frame and identifies that the value of the MAC control parameter field is 0, the link partner 50 can immediately transmit the packet to the network device 100.

The network device 100 can obtain whether the link partner supports the data rate control by a capability of the physical layer exchange. The pause frame defines the pause time period that link partner 50 can not transmit packet. After the pause frame is sent, the network device 100 will not receive any data transmitted from the link partner 50 within the pause time period, so that the network device 100 can enter a power saving mode without data loss. Before the pause time period over, the network device will resume the normal mode for receiving and transmitting packets.

The operation of the state machine unit 110 is disclosed below. In the present embodiment of the disclosure, the state machine unit 110 includes a reception state machine unit and a transmission state machine unit. Since the reception state of the network device 100 and the transmission state thereof are independent, in the power saving mode, circuits for receiving packets and circuits for transmitting packets can be independently turned off.

If connection between the network device 100 and the link partner 50 is high data rate (such as 1 Gbps or above), one of them provides an operating clock and is called a clock master device, while the other receives the operating clock and is called a clock slave device.

If the network device 100 includes multiple ports, that is, multiple physical layer circuits 190, then the state machine unit 110 can independently control the reception state and the transmission state of the multiple ports.

Figure 2:
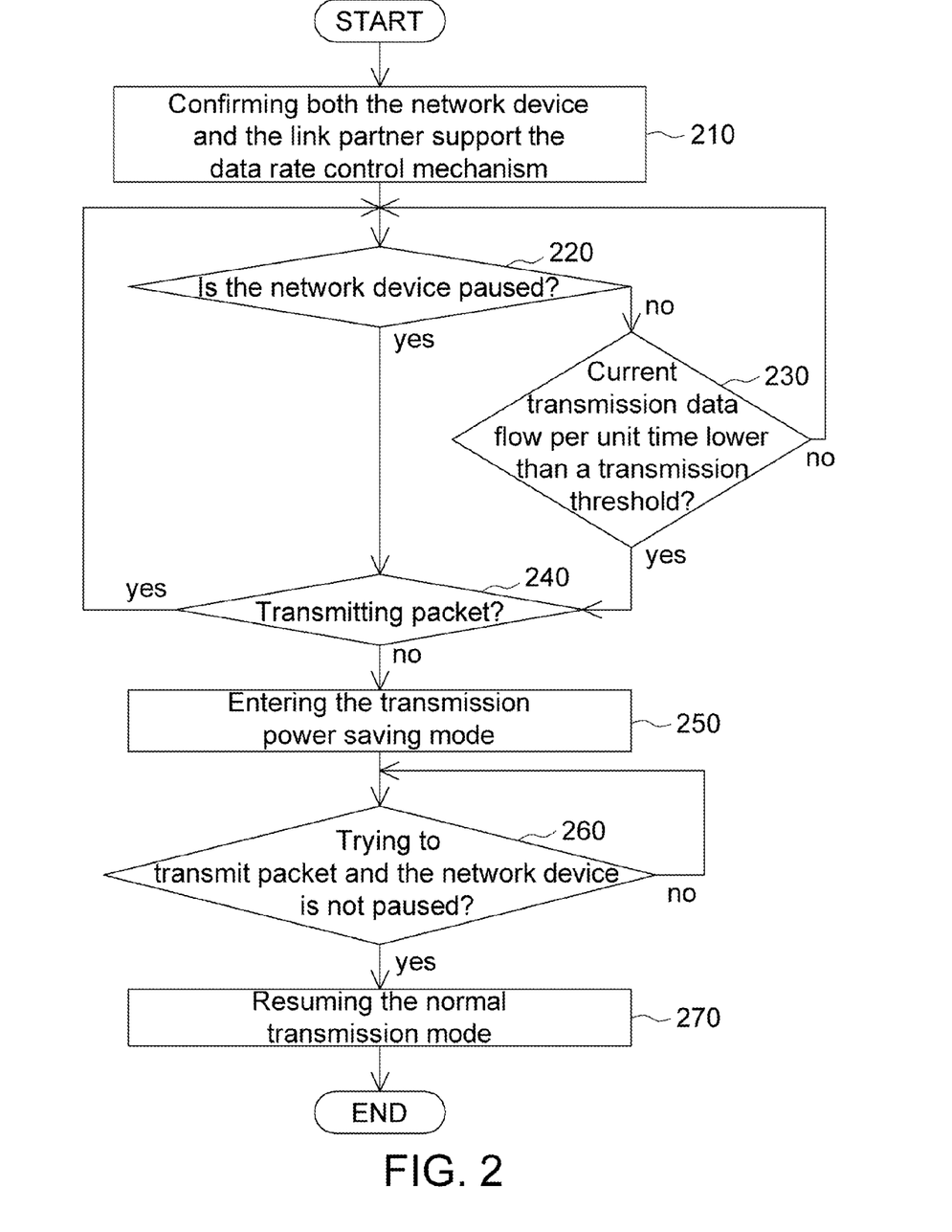
FIG. 2 shows a transmission state of a state machine unit.

Referring to FIG. 2, a transmission state of the state machine unit 110 is shown. As indicated in FIG. 2, in step 210, whether both the network device 100 and the link partner 50 support the data rate control mechanism is confirmed. In the present embodiment of the disclosure, if the network device 100 enters the power saving mode, the link partner 50 is not allowed for packet transmission to avoid data loss, therefore both the network device 100 and the link partner 50 need to support the data rate control mechanism. To put it in greater details, in step 210, it must be assured that the link partner is capable of receiving the pause frame and the pause off frame, and the physical layer circuit 190 of the network device 100 is capable of transmitting both the pause frame and the pause off frame. Whether the link partner 50 is capable of receiving the pause frame and the pause off frame can be identified by physical layer exchange.

In step 220, it checks whether the network device 100 is paused by the link partner 50. To put it in greater details, whether the corresponding connection port of the network device 100 is paused by the link partner 50 is checked, wherein the corresponding connection port is coupled to the link partner 50. The network device 100 may be connected to multiple link partners 50. Thus, in actual operation, the state machine unit 110 must check whether the corresponding connection port (such as the physical layer circuit 190) of the network device 100 is paused by the link partner 50. If yes, the process continues to step 240; otherwise, the process continues to step 230.

If the network device 100 is not paused by the link partner 50, the data rate meter 140 measures whether the current data flow per unit time is lower than a transmission threshold as indicated in step 230. When the current data flow per unit time is lower than the transmission threshold, this implies that the current transmission rate of the network device 100 is very low, and it is possible to set the transmission state of the network device 100 as the power saving mode.

When the network device 100 is paused by the link partner 50, this implies that the link partner 50 may be currently operated in the power saving mode, so the network device 100 is not allowed to transmit packets to the link partner 50. That is, the current packet transmission flow is 0.

In step 240, whether the network device 100 needs to transmit packets to the link partner 50 is checked. If yes, the process returns to step 220; otherwise, the process proceeds to step 250.

In step 250, the network device 100 enters the transmission power saving mode. For example, the state machine unit 110 informs the power control unit 120, and the power control unit 120 controls the packet transmitting unit 150 to enter the power saving mode or turns off the entire physical layer circuit 190.

In step 260, whether the network device 100 needs to transmit packets and whether it is not currently paused are checked. If yes, the process proceeds to step 270; otherwise, the process repeats step 260.

In step 270, the network device 100 resumes the normal transmission mode. For example, the state machine unit 110 informs the power control unit 120, and the power control unit 120 controls the packet transmitting unit 150 to return to the normal mode. Also, after step 270, the process proceeds to step 220.

Figure 3A:
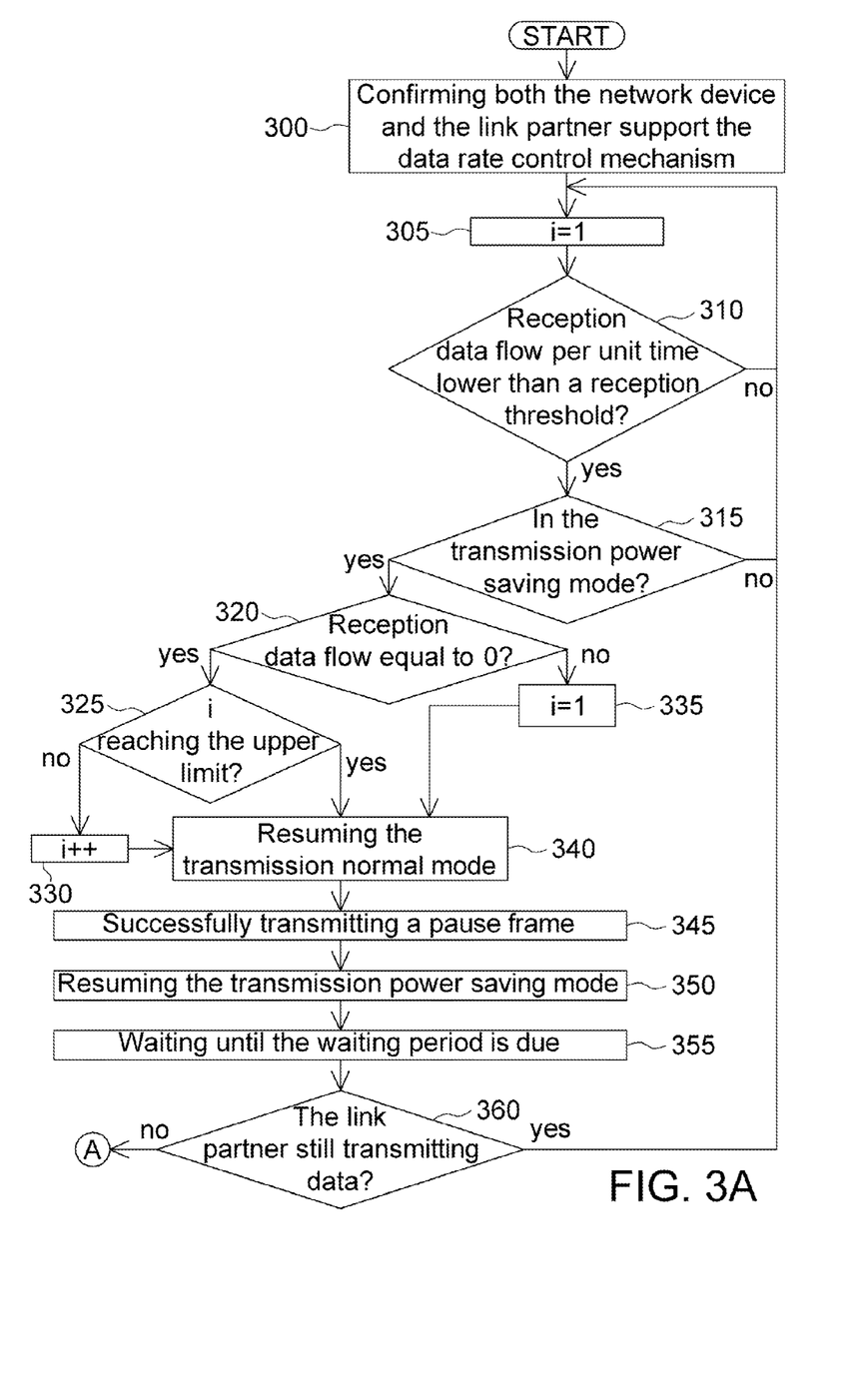
FIG. 3A and FIG. 3B shows a reception state of the state machine unit.
Figure 3B:
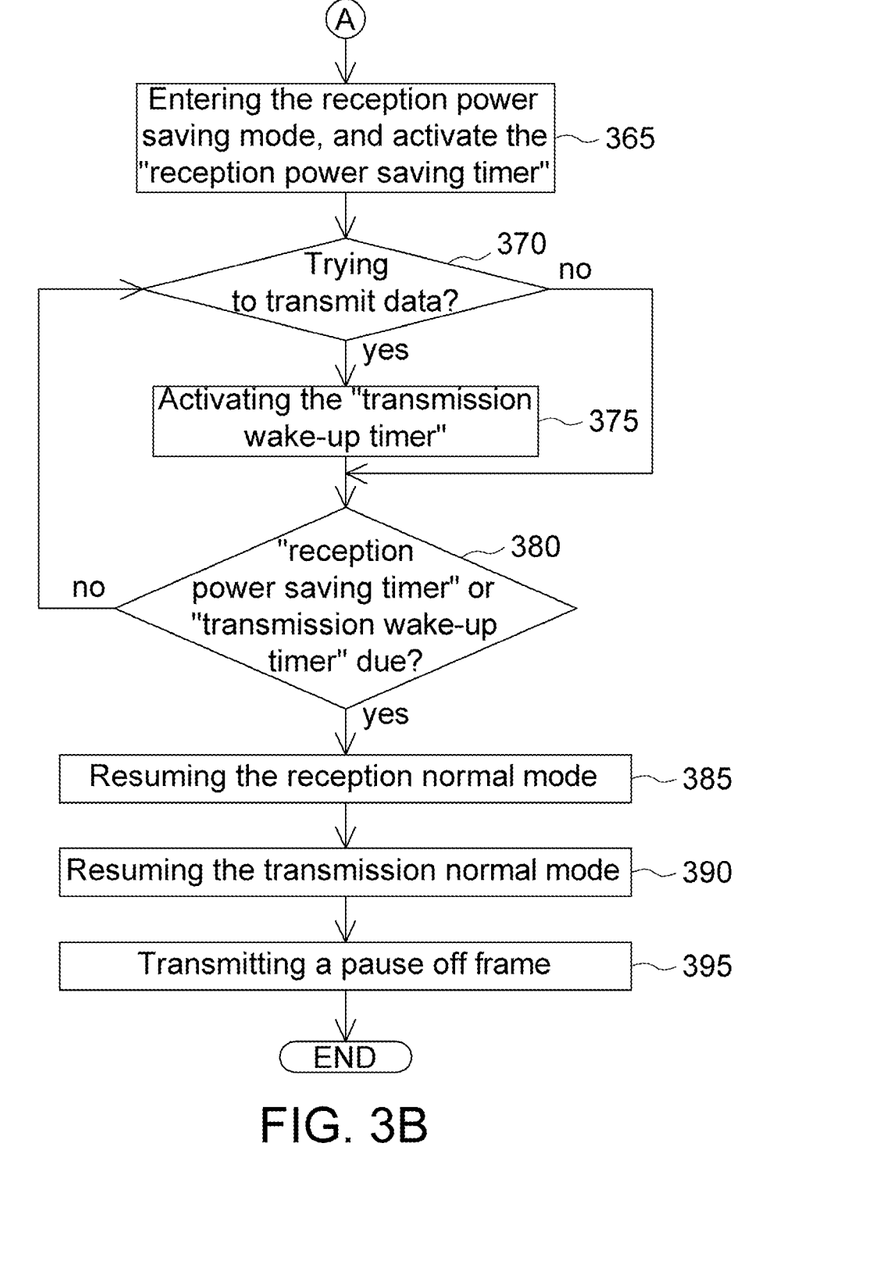

The reception state in the present embodiment of the disclosure is disclosed below. Referring to FIG. 3A and FIG. 3B, the reception state of the state machine unit 110 is sown. In step 300, whether both the network device 100 and the link partner 50 support the data rate control mechanism is confirmed. To put it in greater details, in step 300, it must be assured that the link partner 50 is capable of receiving both the pause frame and the pause off frame, and the physical layer circuit of the network device 100 is capable of receiving both the pause frame and the pause off frame.

In step 305, the parameter i is set, for example, i=1. The parameter i is related to the length of the reception power saving time period of the network device 100.

In step 310, whether the data flow received per unit time is lower than a reception threshold is judged. If yes, the process proceeds to step 315; otherwise, the process returns to step 305.

In step 315, whether the network device is operated in the transmission power saving mode is judged. If yes, the process proceeds to step 320; otherwise, the process returns to step 305. The reason for performing step 315 is that, in network, after the network device 100 transmits a packet to the link partner 50, the link partner 50 will respond a packet back. Thus, if the network device 100 is currently not operated in the transmission power saving mode, this implies that the network device 100 may be possible to transmit a packet just a moment before and will receive a response packet shortly. So in the embodiment of the disclosure, if the network device 100 immediately enters the reception power saving mode under the case that the reception data flow is low, the network device 100 may receive a response packet very soon and has to return to the normal reception mode because the link partner 50 is still possible for data transmission, which may negatively affect the improvement in power saving.

When the network device 100 is operated in the transmission power saving mode, this implies that the network device 100 will not receive any response packet (this is because the network device 100 will not send any packet during the time), and steps 320-365 are for determining the length of the period that the network device 100 is operated in the reception power saving mode.

In step 320, whether the data flow received per unit time is equal to 0 is judged. If yes, the process proceeds to step 325; otherwise, the process proceeds to step 335.

In step 325, whether the parameter i reaches the upper limit is judged. If yes, the process proceeds to step 340; otherwise, the process proceeds to step 330. In the present embodiment of the disclosure, the reception power saving time period can be dynamically extended. When the parameter i reaches the upper limit, this implies that the reception power saving time period also reaches the upper limit and cannot be increased any more.

In step 330, since the parameter i does not yet reach the upper limit, the parameter i is added by 1, and this implies that the reception power saving time period is dynamically extended.

In step 335, since the data flow received per unit time is not equal to 0, the parameter i is set as 1 (the default value). If the parameter i is equal to 1, this implies that the reception power saving time period is set as minimum.

In step 340, the network device 100 resumes the normal transmission mode.

In step 345, the network device 100 successfully transmits the pause frame to the link partner 50. Here, successful transmission for the pause frame means after the network device 100 transmits the pause frame to the link partner 50, the link partner 50 responses a packet to the network device 100.

In step 350, since the network device 100 already successfully transmits the pause frame to the link partner 50, the network device 100 enters into the transmission power saving mode.

In step 355, the network device 100 waits until the "waiting period" is over. When the network device 100 transmits the pause frame to the link partner 50, the link partner 50 may still be transmitting network data to the network device 100. Therefore, in the embodiment of the disclosure, the network device 100 cannot enter the reception power saving mode immediately after transmitting a pause frame lest the network device 100 may be unable to receive the data currently transmitted from the link partner 50 and result in data loss. Therefore, the network device 100 waits until the "waiting period" is over and further judges whether the link partner 50 is still transmitting data. If the link partner 50 does not transmit data, this implies that the link partner 50 already receives the pause frame and accordingly does not transmit data to the network device 100.

In step 360, whether the link partner 50 is still transmitting data is judged. If no (this implies that the link partner already receives the pause frame and accordingly does not transmit data to the network device 100), the process continues to step 365. If yes (this implies that the link partner 50 has not yet finished transmitting the current packet), the process returns to step 305.

In step 365, the network device 100 enters the reception power saving mode, and activates a "reception power saving state timer" which measures how long has the network device 100 been in the reception power saving mode. When the "reception power saving state timer" is over, this implies that the reception power saving time period of the network device 100 is over, and the network device 100 needs to return to the normal reception mode.

In step 370, whether the network device 100 wants to transmit data is judged. If yes, the process proceeds to step 375; otherwise, the process proceeds to step 380.

In step 375, the network device 100 activates the "transmission wake-up timer". In the present embodiment of the disclosure, if the network device 100 wants to transmit data, the network device 100 does not return to the normal mode immediately until the "transmission wake-up period" is over. By doing so, it is assured that every time the network device 100 enters the reception power saving mode, the power saving period would at least last for a period as long as the "transmission wake-up period". So that, after the network device 100 enters the reception power saving mode, the network device 100 will not immediately return to the normal mode to transmit data lest the efficiency of power saving might deteriorate. That is, in the present embodiment of the disclosure, when the network device enters the reception power saving mode if the network device wants to transmit data, the network device cannot enter the normal transmission mode to transmit data until the "transmission wake-up period" is over.

In step 380, whether the "reception power saving state timer" or the "transmission wake-up timer" over is judged. If yes, the process continues to step 385; otherwise, the process returns to step 370. That the "reception power saving timer" is over implies the current reception power saving time period is already due and the network device 100 does not want to transmit data within the current reception power saving time period. That the "transmission wake-up timer" is over implies that although the network device 100 is operated in the reception power saving mode but the network device 100 has data to transmit, so the network device 100 will not enter the normal transmission mode to transmit data until the "transmission wake-up period" is over.

In step 385, the network device 100 resumes the normal reception mode. In step 390, the network device 100 resumes the normal transmission mode. In step 395, the network device 100 successfully transmits the pause off frame (that is, the network device 100 transmits the pause off frame and the link partner 50 transmits a response packet), so that the link partner 50 can resume packet transmission. After step 395, the process returns to step 305.

After the network device 100 enters the reception power saving mode, most circuits of the physical layer circuit 190 of the network device 100 can be turned off except those circuits necessary for maintaining linking state. In general, receiving relevant circuits of the physical layer circuit 190 consume high power, so the power consumption by the receiving relevant circuits is largely reduced in the embodiment of the disclosure.

Figure 4:
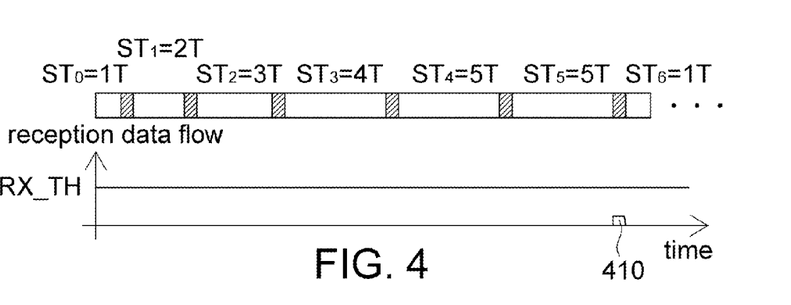
FIG. 4 shows a dynamic extension of a power-saving period according to the embodiment of the disclosure.

How the present embodiment of the disclosure dynamically extends the reception power saving time period is disclosed below. Referring to FIG. 4, dynamic extension of the reception power saving time period according to the embodiment of the disclosure is shown. In the present embodiment of the disclosure, when the data flow received per unit time is equal to 0, this implies that the current data rate is low and the link partner 50 have been not transmitted data for quite a long while, therefore the next reception power saving time period can be extended to improve power saving efficiency. If the current reception power saving time period already reaches the maximum, then the next reception power saving time period is maintained but not extended despite the data flow received per unit time is equal to 0, lest the network device 100 might stay in the reception power saving mode indefinitely and negatively affect the data transmission efficiency of the link partner 50. If the data flow received per unit time is not equal to 0, then the next reception power saving time period will be set as the minimum value.

As indicated in FIG. 4, $ST_0$~$ST_6$ denote reception power saving time periods, and the slashed areas denote the normal mode period of the network device. For example, the slashed area denotes the time required for waking up the physical layer circuit of the network device, the time required for transmitting the pause frame and the time required for measuring the data flow received per unit time. Let $ST_0$ denote the first reception power saving time period whose length is set as 1T (T denotes a reception power saving unit time period, and meanwhile, i=1). After that, the data flow is 0, so the second reception power saving time period $ST_1$~the fifth reception power saving time period $ST_4$ will be dynamically extended as 2 T-5 T (i=2~5). Let the upper limit of the parameter i be set as 5 (so the maximum reception power saving time period is 5 T), and the sixth reception power saving time period $ST_5$ maintains at 5 T. After the sixth reception power saving time period $ST_5$ is over, the data flow 410 is measured, which is smaller than the reception threshold RX_TH, so the next reception power saving time period $ST_6$ is set as the minimum value (i=1). If the data flow is larger than reception threshold, then the network device 100 returns to the normal reception mode as soon as possible.

In the present embodiment of the disclosure, the operating mode of the network device 100 includes the normal mode and the power saving mode. In the normal mode, the physical layer circuit 190 of the network device 100 is turned on, and the network device 100 is capable of receiving/transmitting packet. In the power saving mode, the physical layer circuit 190 of the network device 100 is operated with low power consumption, and is incapable of receiving/transmitting packet, but the link between the link partner 50 and the network device 100 is still valid (that is, the link partner 50 does not regard its link with the network device 100 is disconnected).

Figure 5:
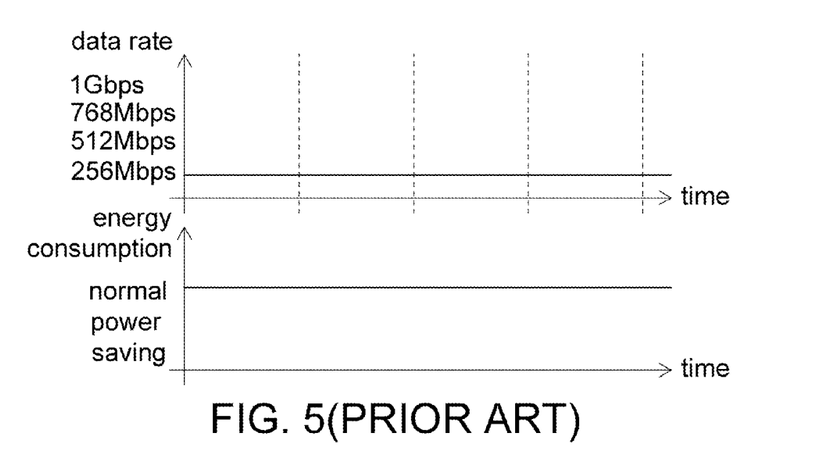
FIG. 5 (prior art) shows an actual data rate and power consumption of a conventional network device.
Figure 6:
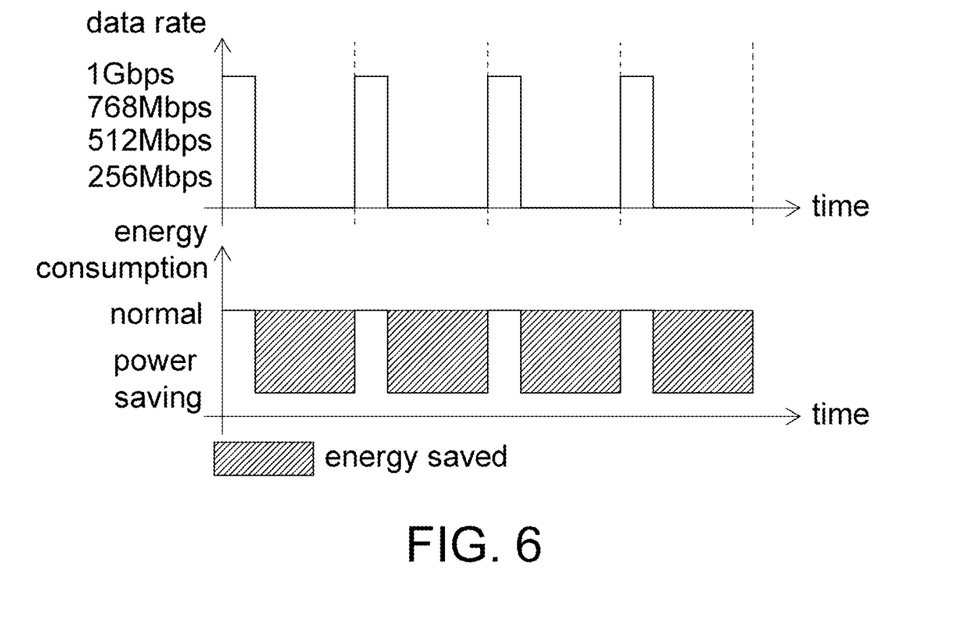
FIG. 6 shows an actual data rate and power consumption of the network device according to the embodiment of the disclosure.

The power saving effect of the present embodiment of the disclosure is known by comparing FIG. 5 and FIG. 6. Let the maximum transmission rate between the network device and its linked link partner be set as 1 Gbps, and their data rate be fixed as 256 Mbps.

The actual data rate and the power consumption of the conventional network device are illustrated in FIG. 5. When the link partner 50 continually transmits data at a low data rate, the conventional network device needs to continually maintain at a normal state for allowing the transmission/reception of packet. Therefore, the conventional network device has high power consumption but low data rate for most of the time, and its bandwidth utilization is poor.

The actual data rate and the power consumption of the network device of the present embodiment of the disclosure are illustrated in FIG. 6. The network device of the present embodiment of the disclosure enters into the normal mode or the power saving mode. When the network device is operated in the power saving mode, the network device operates in the manner of power saving, neither receiving nor transmitting data until resuming the normal mode. Besides, when the network device 100 enters the power saving mode, if the link partner 50 wants to transmit data, the link partner 50 buffers the data until receiving the pause off frame transmitted from the network device 100. Therefore, the network device of the present embodiment of the disclosure incurs lower power consumption, and has better bandwidth utilization in the normal mode.

The power saving network device disclosed in the above embodiments of the disclosure calculates the data rate of the network packets, and further judges whether the data rate is lower than a threshold. If the data rate is lower than the threshold, then the network device transmits a pause frame to the link partner so that the link partner stops packet transmission. During the pause period, the network device is operated in a power saving mode. After the pause period is over, the network device resumes the normal mode. Thus, the power consumption by the network device during the low data flow period is reduced.

The power saving network device disclosed in the above embodiments of the disclosure is applied in switch, router, bridge or similar devices of a local area network.

The power saving network device disclosed in the above embodiments of the disclosure has many advantages exemplified below:

1. The physical layer circuit does not need special design. Since most network devices already support the data rate control mechanism, the network device of the above embodiments of the disclosure can control the data rate from its linked network devices through data rate control without any specific physical layer design.

2. The new power saving mechanism disclosed in the above embodiments of the disclosure effectively saves power consumption even when the network communication is in the normal mode.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A network device applied in a wired network, the network device transmitting data between a link partner via the wired network, the network device comprising:
a data rate meter for detecting a data rate of the network device;
a state machine unit coupled to the data rate meter for determining an operating mode of the network device according to the data rate and for generating an instruction signal; and
a power control unit coupled to the state machine unit for controlling a power consumption state of the network device according to the instruction signal;
wherein the state machine unit determines whether the network device transmits a pause frame to the link partner according to the data rate, so that the link partner stops data transmission during a pause period and the power control unit controls the network device in a power saving mode during the pause period, wherein responsive to the transmission of the pause frame but prior to entering the power saving mode, the state machine unit detects whether or not the link partner continues to transmit data that is transmitted independently of the transmission of the pause frame.

2. The network device according to claim 1, further comprising:
a packet receiving unit coupled to the data rate meter, the packet receiving unit extracting a length data from a received packet and transmitting to the data rate meter, the received packet transmitted to the network device from the link partner.

3. The network device according to claim 2, further comprising:
a packet transmitting unit coupled to the data rate meter, the packet transmitting unit extracting a length data from a transmitted packet and transmitting to the data rate meter, the transmitted packet transmitted to the link partner from the network device.

4. The network device according to claim 3, further comprising:
a pause frame generating unit coupled to the state machine unit and the packet transmitting unit, the pause frame generating unit generating the pause frame and a pause off frame and transmitting to the link partner via the packet transmitting unit.

5. The network device according to claim 4, wherein:
when the data rate is lower than a transmission threshold, the power control unit turns off the packet transmitting unit according to the instruction signal from the state machine unit.

6. The network device according to claim 4, wherein:
when the data rate is lower than a reception threshold, the state machine unit controls the pause frame generating unit to generate the pause frame, the pause frame defining the pause period, and the power control unit turns off the packet receiving unit according to the instruction signal from the state machine unit.

7. The network device according to claim 6, wherein:
when the data rate is substantially 0, the state machine unit dynamically extends a reception power saving time period of the network device.

8. The network device according to claim 7, wherein:
when the data rate is not equal to 0 but lower than the reception threshold, the state machine unit controls the reception power saving time period of the network device as a minimum value.

9. The network device according to claim 8, wherein:
after the pause frame is transmitted out, if the link partner already stops transmitting data to the network device, then the network device enters a reception power saving mode and starts to time the reception power saving time period; and after the reception power saving time period is over, the network device resumes the normal mode and transmits the pause off frame to the link partner for allowing the link partner to transmit data between the network device.

10. The network device according to claim 9, wherein: when the network device is operated in the reception power saving mode, if the network device tries to transmit data to the link partner, then the network device activates a transmission wake-up timer; and after the transmission wake-up timer is over, the network device resumes the normal mode, and transmits the pause off frame to the link partner for allowing the link partner to transmit data between the network device.

11. A network communication method applied in a network device, the network device transmitting data between a link partner through a wired network, the method comprising:
detecting a data rate of the network device;
determining an operating mode of the network device according to the data rate, and generating an instruction signal;
controlling a power consumption state of the network device according to the instruction signal;
according to the data rate, determining whether the network device transmits a pause frame to the link partner so that the link partner stops data transmission during a pause period; and
controlling the network device to be operated in a power saving mode during the pause period, wherein responsive to transmittal of the pause frame but prior to entering the power saving mode, detecting whether or not the link partner continues to transmit data that, when transmitted, is transmitted independently of the transmission of the pause frame.

12. The method according to claim 11, wherein, the step of detecting the data rate of the network device comprises:
extracting a length data from a received packet to detect the data rate of the network device, wherein the received packet is transmitted to the network device from the link partner.

13. The method according to claim 12, wherein, the step of detecting the data rate of the network device comprises:
extracting a length data from a transmitted packet to detect the data rate of the network device, wherein the transmitted packet is transmitted to the link partner from the network device.

14. The method according to claim 13, further comprising:
controlling the network device to enter a transmission power saving mode when the data rate is lower than a transmission threshold.

15. The method according to claim 14, wherein:
when the data rate is lower than a reception threshold, generating and sending the pause frame which defines the pause period to the link partner.

16. A network device applied in a wired network, comprising:
a data rate meter for detecting a data rate of the network device;
a state machine unit coupled to the data rate meter for determining an operating mode of the network device according to the data rate and for generating an instruction signal; and
a power control unit coupled to the state machine unit for controlling a power consumption state of the network device according to the instruction signal;
wherein the state machine unit determines whether the network device transmits a pause frame according to the data rate, and after the pause frame is transmitted out, the state machine unit determines that the operating mode is a power saving mode and the power control unit reduces the power consumption of the network device so that the network device is operated in the power saving mode, wherein responsive to the transmission of the pause frame but prior to entering the power saving mode, the state machine unit detects whether or not the link partner continues to transmit data that, if transmitted, is not transmitted in response to transmission of the pause frame.

17. The network device according to claim 16, wherein, when the data rate is lower than a threshold, the state machine unit controls a pause frame generating unit to generate the pause frame.

18. The network device according to claim 17, wherein, when the data rate is lower than the threshold, the state machine unit checks whether the network device tries to transmit packet, and if no, the state machine unit controls the pause frame generating unit to generate the pause frame.

19. The network device according to claim 16, wherein, the power control unit turns off a power of a physical layer circuit of the network device to reduce the power consumption of the network device.

20. The network device according to claim 16, wherein, the pause frame defines a pause period that the network device is operated in the power saving mode.

* * * * *